US006915193B2

(12) United States Patent
Lu et al.

(10) Patent No.: US 6,915,193 B2
(45) Date of Patent: Jul. 5, 2005

(54) METHOD FOR DETERMINING A LONGITUDINAL VEHICLE VELOCITY BY COMPENSATING INDIVIDUAL WHEEL SPEEDS USING PITCH ATTITUDE

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 10/605,842

(22) Filed: Oct. 30, 2003

(65) Prior Publication Data

US 2004/0172183 A1 Sep. 2, 2004

Related U.S. Application Data

(60) Provisional application No. 60/450,143, filed on Feb. 26, 2003.

(51) Int. Cl.[7] .............................................. G06F 19/00
(52) U.S. Cl. ............................. 701/38; 701/36; 701/41; 180/271; 340/440
(58) Field of Search .............................. 701/36, 38, 41, 701/45, 46; 180/271, 282; 280/5.502, 5.506, 5.507; 340/440

(56) References Cited

U.S. PATENT DOCUMENTS

| 5,184,876 | A | 2/1993 | Beyer et al. ................. 303/121 |
| 5,364,174 | A | 11/1994 | Becker et al. ................. 701/74 |
| 5,365,444 | A | 11/1994 | Suzuki et al. ................. 701/74 |
| 5,388,895 | A | 2/1995 | Negrin ........................ 303/154 |
| 5,471,388 | A | 11/1995 | Zomotor et al. | |
| 6,112,146 | A | 8/2000 | Mueller ........................ 701/71 |
| 6,192,305 | B1 * | 2/2001 | Schiffmann ................... 701/45 |
| 6,223,135 | B1 | 4/2001 | Muller ........................ 702/148 |
| 6,224,171 | B1 | 5/2001 | Riedemann et al. ......... 303/195 |
| 6,292,759 | B1 * | 9/2001 | Schiffmann ................. 702/151 |
| 6,338,012 | B2 | 1/2002 | Brown et al. | |
| 6,529,803 | B2 | 3/2003 | Meyers et al. | |
| 6,556,908 | B1 * | 4/2003 | Lu et al. ........................ 701/38 |
| 6,631,317 | B2 * | 10/2003 | Lu et al. ........................ 701/45 |

FOREIGN PATENT DOCUMENTS

| EP | 1 234 741 A2 | 8/2002 |
| GB | 2 388 435 A | 11/2003 |
| GB | 2 389 828 A | 12/2003 |

* cited by examiner

*Primary Examiner*—Gertrude A. Jeanglaude
(74) *Attorney, Agent, or Firm*—Gary Smith

(57) ABSTRACT

A control system (24) for controlling a safety system (40) of an automotive vehicle includes a plurality of wheel speed sensors (30) generating a plurality of wheel velocity signals, a steering angle sensor (39) generating a steering actuator angle signal, a yaw rate sensor (28) generating a yaw rate signal, a longitudinal acceleration sensor (32) generating a longitudinal acceleration signal and a pitch angle generator generating a pitch angle signal and a controller (26). The controller (26) generates a longitudinal vehicle velocity in response to the plurality of wheel speed signals, the steering angle signal, the yaw rate signal, the lateral acceleration signal and the pitch rate signal. The controller (26) may determine a slip-related longitudinal velocity and a non-slip longitudinal velocity as intermediate steps.

39 Claims, 2 Drawing Sheets

METHOD FOR DETERMINING A LONGITUDINAL VEHICLE VELOCITY BY COMPENSATING INDIVIDUAL WHEEL SPEEDS USING PITCH ATTITUDE

CROSS REFERENCE TO RELATED APPLICATIONS

The present invention claims priority to provisional application No. 60/450,143, filed on Feb. 26, 2003, and is related to patent application Ser. No. 10/041,246, filed Jan. 8, 2002, the disclosure of which is incorporated by reference.

BACKGROUND OF INVENTION

The present invention relates generally to dynamic control systems for automotive vehicles and, more specifically to a system that compensates wheel speed sensor signals to determine a vehicle reference velocity.

It is a well-known practice to control various operating dynamics of a motor vehicle to achieve active safety. Examples of active safety systems include traction control, yaw stability control and roll stability control systems. A more recent development has been to combine all the available subsystems to achieve better vehicle safety and dynamics performance. The effective operation of the various control systems requires high-accuracy and fast-response-times in the determination of the operating states of the vehicle, regardless of road conditions and driving conditions. Such vehicle operating states include the vehicle longitudinal, lateral and vertical velocities measured along the body-fixed longitudinal, lateral and vertical axes, the attitude of the vehicle body, and the travel course of the vehicle.

One piece of basic information that forms the aforementioned vehicle state estimation is the linear velocity of the rotating centers of the four wheels. For example, this information can be used to assess the wheel slip used in anti-lock brake controls and traction controls and to estimate the longitudinal velocity of the vehicle. In order to obtain the linear corner velocities, the wheel speed sensors are used. The wheel speed sensors output the products of the wheel rotational speeds and the rolling radii. The wheel rotational speeds are directly measured and the rolling radii are assumed their nominal values. During dynamic maneuvers, the variations of the wheel normal loading will affect the rolling radii. Hence, the nominal rolling radii may not reflect the actual rolling radii and thus cause errors in the calculation of the wheel speeds.

The determination of the longitudinal velocity is also affected by gravity. That is, if the vehicle is on a pitched road, gravity may affect some of the readings from the acceleration sensors, such as the lateral acceleration signal.

It would therefore be desirable to provide a more accurate way in which to determine the vehicle speed taking into consideration changes in rolling radii.

SUMMARY OF INVENTION

The present invention provides an improved determination of the individual wheel speeds. In the present invention the individual wheel speed calculations may be compensated for by learning the rolling radii of the wheels. Thus, a more accurate determination of the vehicle reference velocity or the longitudinal velocity may be determined.

In one aspect of the invention, a control system for controlling a safety system of an automotive vehicle includes a plurality of wheel speed sensors generating a plurality of wheel velocity signals, a steering angle sensor generating a steering actuator angle signal, a yaw rate sensor generating a yaw rate signal, a longitudinal acceleration sensor generating a longitudinal acceleration signal and a pitch angle generator generating a pitch angle signal and a controller. The controller generates a longitudinal vehicle velocity in response to the plurality of wheel speed signals, the steering angle signal, the yaw rate signal, the lateral acceleration signal and the pitch rate signal. The controller may determine a slip-related longitudinal velocity and a non-slip longitudinal velocity as intermediate steps.

In a further aspect of the invention, a method of controlling a safety system for an automotive vehicle having a plurality of wheels includes determining a non-slip longitudinal velocity, determining a slip-related longitudinal velocity, determining a longitudinal velocity of the vehicle in response to the non-slip longitudinal velocity and the slip related longitudinal velocity, and controlling a safety system in response to the longitudinal velocity.

One advantage of the invention is that the pitch attitude can be taken into consideration resulting in a more accurate longitudinal velocity determination.

Other features of the present invention will become apparent when viewed in light of the detailed description of the preferred embodiment when taken in conjunction with the attached drawings and appended claims.

DETAILED DESCRIPTION

Figure 1:
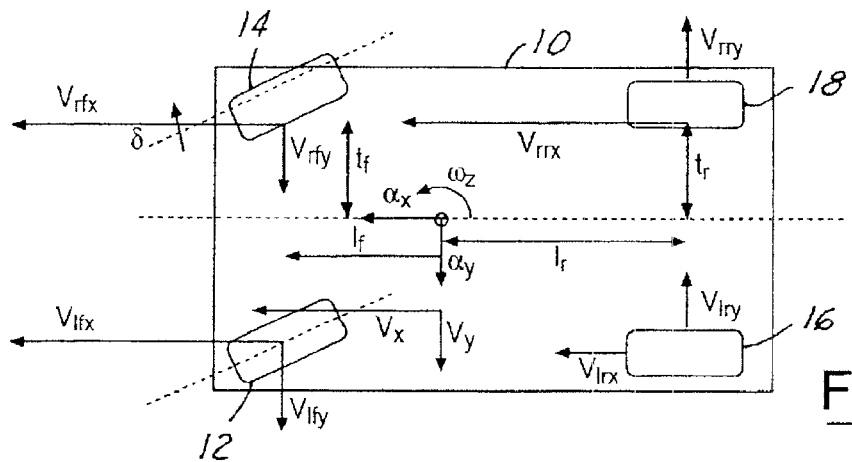
FIG. 1 is a top view of a motor vehicle illustrating various operating parameters of a vehicle experiencing a turning maneuver on a road surface.

In the following figures the same reference numerals will be used to illustrate the same components.

Referring now to FIG. 1, various operating parameters and variables used by the present invention are illustrated as they relate to the application of the present invention to a ground based motor vehicle 10 having wheels 12, 14, 16, 18. Those skilled in the art will immediately recognize the basic physics represented by these illustrations, thereby making the adaptation to different types of vehicles easily within their reach. Lateral and longitudinal velocities of the center of gravity are denoted as $V_x$ and $V_y$, a yaw angular rate is denoted as $\omega_z$, a front wheel steering angle is denoted as $\delta$, lateral acceleration is represented by $a_y$, and longitudinal acceleration is represented by $a_x$.

Using those vehicle motion variables, the velocities of the vehicle at the four corner locations, where the wheels are attached to the vehicle, can be calculated. The velocities are projected along the body fixed longitudinal and lateral directions $$V_{lfx}=V_x-\omega_z t_f, \quad V_{lfy}=V_y+\omega_z l_f$$
$$V_{rfx}=V_x-\omega_z t_f, \quad V_{rfy}=V_y+\omega_z l_f$$
$$V_{lrx}=V_x-\omega_z t_r, \quad V_{lfy}=V_y+\omega_z l_f$$
$$V_{rrx}=V_x-\omega_z t_f, \quad V_{rry}=V_y+\omega_z l_f \quad (1)$$

where $t_f$ and $t_r$ are the half tracks for the front and rear axles, $l_f$ and $l_r$ are the distances between the center of gravity of the vehicle and the front and rear axles. The variables $V_{lf}$, $V_{rf}$, $V_{lr}$ and $V_{rr}$ are the linear velocities of the four corners along the wheel heading directions (left front, right front, left rear and right rear, respectively), which can be calculated in the following $$V_{lf}=V_{lfx}\cos(\delta)+V_{lfy}\sin(\delta)$$
$$V_{rf}=V_{rfx}\cos(\delta)+V_{rfy}\sin(\delta)$$
$$V_{lr}=V_{lrx}$$
$$V_{rr}=V_{rrx} \quad (2)$$

Substituting (1) into (2), the following is obtained $$V_{lf}=(V_x-\omega_z t_f)\cos(\delta)+(v_y+\omega_z l_f)\sin(\delta)$$
$$V_{rf}=(V_x-\omega_z t_f)\cos(\delta)+(v_y+\omega_z l_f)\sin(\delta)$$
$$V_{lf}=V_x-\omega_z t_r$$
$$V_{rr}=V_x-\omega_z t_r \quad (3)$$

Considering $$v_y=v_x\tan(\beta) \quad (4)$$

Therefore, equation (3) can be used to compute both $V_x$ and $\beta$. Since there are two unknowns and four constraints in equation (3), there are several ways of computing $V_x$ and $\beta$.

Figure 2:
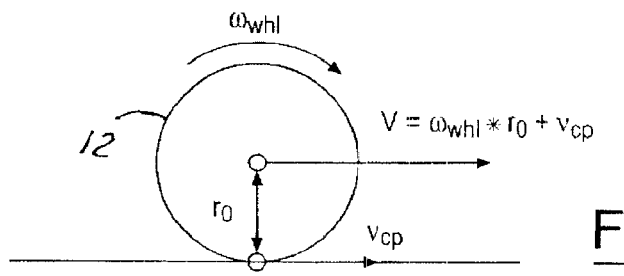
FIG. 2 is a side view of a motor vehicle wheel illustrating various operating parameters of the wheel.

Referring now to FIG. 2, vehicle corner velocity along the wheel longitudinal direction is equal to the sum of the contact patch slip velocity $v_{cp}$ and the product of the wheel rotational rate $\omega_{whl}$ and its rolling radius $r_o$.

Figure 3:
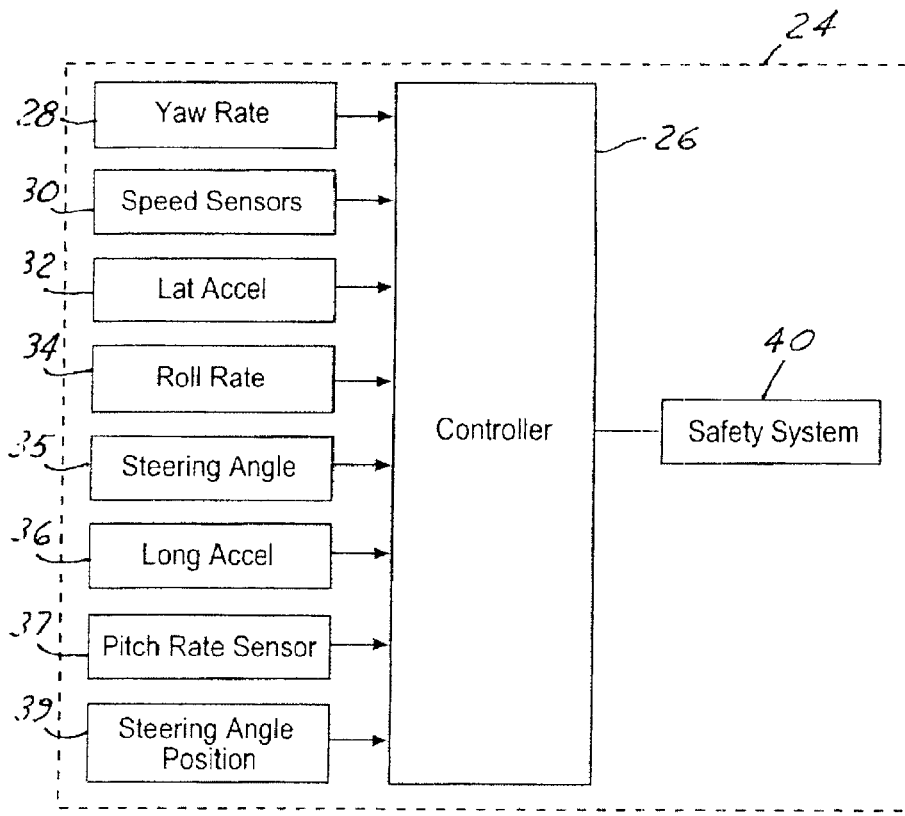
FIG. 3 is a block diagram showing a portion of a microprocessor interconnected to sensors and controlled devices, which may be included in a system according to the present invention.

Referring now to FIG. 3, stability control system 24 has a controller 26 used for receiving information from a number of sensors which may include a yaw rate sensor 28, speed sensors 30 (at each wheel), a lateral acceleration sensor 32, a roll rate sensor 34, a steering angle (hand wheel position) sensor 35, a longitudinal acceleration sensor 36, a pitch sensor 37, and steering angle position sensor 39. Steering angle position sensor 39 senses the position of the steered road wheels. Lateral acceleration, longitudinal acceleration, yaw rate, roll orientation and speed may also be obtained using a global positioning system (GPS). Based upon inputs from the sensors, controller 26 controls the safety system 40. Depending on the desired sensitivity, the type of safety system and various other factors, not all the sensors 28–39 may be used in a commercial embodiment. Other factors may be obtained from the sensors such as the surface mu and the vehicle side slip angle, β.

Roll rate sensor 34 and pitch sensor 37 may sense the roll condition to be used with a rollover control system as an extension of the present application. The pitch sensor 37 may be part of a pitch angle generator that generates a pitch angle (longitudinal slope of the vehicle) of the vehicle. In some cases the pitch angle may be measured directly by the pitch sensor if it is a pitch angle sensor. However, for a high volume application such pitch angle sensors are typically cost prohibitive. A pitch rate sensor signal may be used to determine the pitch angle. This: may be performed in a stand alone unit or within controller 26. Of course, other ways of determining pitch angle may be used.

Safety system 40 may be a number of types of safety systems including a roll stability control system, a yaw control system, antilock brakes, traction control, airbags, or active suspension system. Each of the types of safety systems 40 use the longitudinal velocity for various calculations. Those skilled in the art of safety systems will appreciate the specific use.

Safety system 40, if implemented as roll control, may control a position of a front right wheel actuator, a front left wheel actuator, a rear left wheel actuator, or a right rear wheel actuator. Although, as described above, two or more of the actuators may be simultaneously controlled as one actuator. Based on the inputs from sensors 28 through 39, controller 26 determines the vehicle dynamic condition and controls the safety system. Controller 26 may also use brake control coupled to front right brakes, front left brakes, rear left brakes, and right rear brakes to dynamically control the vehicle. By using brakes in addition to steering control to prevent rollover some control benefits may be achieved. For example, yaw control and rollover control may be simultaneously accomplished.

Speed sensor 30 may be one of a variety of speed sensors known to those skilled in the art. For example, a suitable speed sensor may include a sensor at every wheel that is averaged by controller 26. As will be described below, the controller 26 translates the wheel speeds into the speed of the vehicle.

Figure 4:
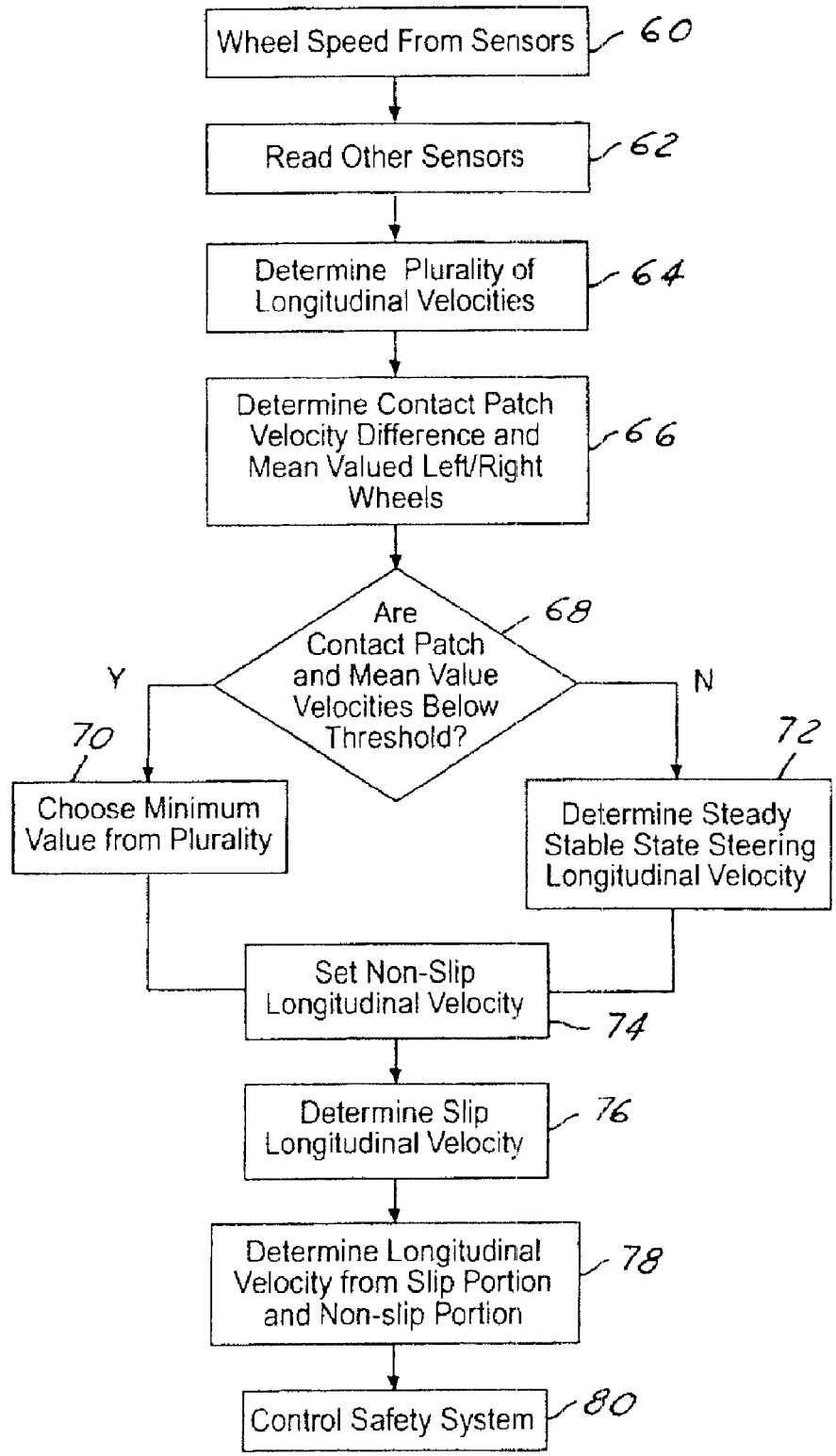
FIG. 4 is a control system block diagram in accordance with the present invention.

Referring now to FIG. 4, a method of operating a safety system using a corrected vehicle velocity is determined. In step 60 the wheel speed sensors are read. In one embodiment each wheel has a separate speed sensor. In step 62 the other sensors applicable to the system are read. In step 64 a plurality of non-slip longitudinal velocities are determined. Slip related longitudinal velocity is described further below. As is described below, one of many different calculations may be performed and selected from the non-slip longitudinal velocity determination.

The average front corner speed as $V_{f\text{-}ave}$ and the rear average corner speed is defined as $V_{r\text{-}ave}$, i.e.

$$V_{f\text{-}ave}=\frac{V_{lf}+V_{rf}}{2} \quad (5)$$
$$V_{r\text{-}ave}=\frac{V_{lr}+V_{rr}}{2}.$$

Then equation leads to $$V_{f\text{-}ave}=V_x[\cos(\delta)+\sin(\delta)\tan(\beta)]\omega_z l_f \sin(\delta) \quad V_{r\text{-}ave}=V_x \quad (6)$$

which can be used to construct the side slip angle as in the following $$\beta = \tan^{-1}\left\{\frac{V_{f-ave} - V_{r-ave}\cos(\delta) - \omega_z l_f \sin(\delta)}{V_{r-ave}\sin(\delta)}\right\}. \quad (7)$$

Notice that the vehicle side slip angle β can only be computed from when the vehicle steering angle is non-zero. If the steering angle is around zero, the method proposed in Ford patent application Ser. No. 10/041,246 filed Jan. 8, 2002, the disclosure of which is incorporated by reference, may be used. One method set forth therein is $$B_{lat-yaw} = \frac{l_r \omega_z}{v_x} + \frac{I_z \dot{\omega} + M_z + t_f M[a_y - g\sin(\theta_x)\cos(\theta_y)]}{t_r C_r}. \quad (8)$$

Or in digital environment $$\beta_{lat-yaw}(k) = \frac{l_r \omega_z(k)}{v_x(k)} + \frac{-I_z \dot{\omega}(k) + M_z(k) + t_f M[a_y(k) - g\sin(\theta(k)_x)\cos(\theta_y(k))]}{t_r C_r}$$

where $M_z$ is the yaw moment generated from actuators, $C_r$ is the cornering stiffness at the rear axle.

In this example six ways are set forth for computing the longitudinal velocity from the four corner speeds $V_{lf}$, $V_{rf}$, $V_{lr}$ and $V_{rr}$. These can be summarized in the following $$V_{x1} = \frac{V_{lr} + V_{rr}}{2} \quad (9)$$

$$V_{x2} = \frac{V_{f-ave} - \omega_z l_f \sin(\delta)}{\cos(\delta) + \sin(\beta)\sin(\delta)}$$

$$V_{x3} = \frac{V_{lf} + \omega_z[t_f \cos(\delta) - l_f \sin(\delta)]}{\cos(\delta) + \sin(\beta)\sin(\delta)}$$

$$V_{x4} = \frac{V_{rf} - \omega_z[t_f \cos(\delta) - l_f \sin(\delta)]}{\cos(\delta) + \sin(\beta)\sin(\delta)}$$

$$V_{x2} = V_{lr} + \omega_z t_r$$

$$V_{x2} = V_{rr} - \omega_z t_r$$

and all of those computations should be equal (nearly, in a practical sense) to the actual longitudinal vehicle speed $V_x$, i.e.

$$V_x = V_{xi}, \text{ for } i=1, 2, \ldots, 6 \quad (10)$$

Notice that equation (9) is true for all driving and road conditions due to the fact that they are from the kinematic relationships between motion variables.

From the longitudinal velocity, the four vehicle corner velocities $V_{lf}$, $V_{rf}$, $V_{lr}$ and $V_{rr}$ may be computed. The corner velocities can be measured by mounting four velocity sensors on the four wheels, which sense the longitudinal velocities of the center of the wheels along the heading directions of the wheel (or the wheel longitudinal directions). The velocity sensor may be further replaced by four acceleration sensors, which sense the linear acceleration of the center of the wheels along the heading directions of the wheels.

As mainly considered here for a vehicle without the aforementioned corner velocity sensor or corner acceleration sensors, the available sensors are the wheel speed sensors used in anti-lock brake systems. Those ABS wheel speed sensors measure the rotational speed of the wheels. The wheel speed sensor outputs usually are calibrated for providing the linear directional velocities $v_{sensor-lf}$, $v_{sensor-rf}$, $v_{sensor-lr}$ and $v_{sensor-rr}$ by multiplying the wheel rotational angular speed with the nominal rolling radii of the wheels as is shown in FIG. 2. Notice that the wheels experience not only the rotational motion but also the linear sliding motion or longitudinal slip. The longitudinal slip is caused by the relative motion between the wheel and the road at the contact patch.

If the longitudinal velocities of such relative motions at the contact patches are denoted as $v_{cp-lf}$, $v_{cp-rf}$, $v_{cp-lr}$ and $v_{cp-rr}$, then the vehicle corner velocities can be expressed as the sums of two speeds as in the following $$V_{lf}=V_{cp-lf}+V_{sensor-lf}, \; V_{rf}=V_{cp-rf}+V_{sensor-rf}$$

$$V_{lr}=V_{cp-lr}+V_{sensor-lr}, \; V_{rr}=V_{cp-rr}+V_{sensor-rr} \quad (11)$$

If there is no slip on the four wheels, $v_{cp-lf}$, $v_{cp-rf}$, $v_{cp-lr}$ and $v_{cp-rr}$ should all be zero, and the wheel speed sensors provide the exact characterization of vehicle corner speeds. Hence the equations in (9) can be used to estimate vehicle side slip angle and the instantaneous longitudinal velocity.

If $V_{cp-lf}$, $v_{cp-rf}$, $v_{cp-lr}$ and $v_{cp-rr}$ are non-zero, but whose magnitudes are all fractions of the magnitudes of $v_{sensor-lf}$, $V_{sensor-rf}$, $v_{sensor-lr}$ and $v_{sensor-rr}$, then the minimum of the six calculated variables can be used to characterize the vehicle longitudinal velocity as in the following $$\hat{V}_x = \min\{\hat{V}_{x1}, \hat{V}_{x2}, \hat{V}_{x3}, \hat{V}_{x4}, \hat{V}_{x5}, \hat{V}_{x6}\} \quad (12)$$

where $\hat{V}_{x1}, \hat{V}_{x2}, \hat{V}_{x3}, \hat{V}_{x4}, \hat{V}_{x5}, \hat{V}_{x6}$ are similarly computed as in equation (9) but with the sensor signals replacing the corner velocities as in the following $$\hat{V}_{x1} = \frac{v_{sensor-lr} + v_{sensor-rr}}{2} \quad (13)$$

$$\hat{V}_{x2} = \frac{0.5 * (v_{sensor-lf} + v_{sensor-rf}) - \omega_z l_f \sin(\delta)}{\cos(\delta) + \sin(\beta)\sin(\delta)}$$

$$\hat{V}_{x3} = \frac{v_{sensor-lf} + \omega_z[t_f \cos(\delta) - l_f \sin(\delta)]}{\cos(\delta) + \sin(\beta)\sin(\delta)}$$

$$\hat{V}_{x4} = \frac{v_{sensor-rf} + \omega_z[t_z \cos(\delta) - l_f \sin(\delta)]}{\cos(\delta) + \sin(\beta)\sin(\delta)}$$

$$\hat{V}_{x2} = v_{sensor-lr} + \omega_z t_r$$

$$\hat{V}_{x2} = v_{sensor-rr} - \omega_z t_r.$$

Considering $\sin(\delta)\sin(\beta)$ is negligible in contrast to $\cos(\delta)$, hence $\hat{V}_{x2}, \hat{V}_{x3}, \hat{V}_{x4}$ can be further calculated independent of the vehicle side slip angle $$\hat{V}_{x2} \approx \frac{v_{sensor-lf} + v_{sensor-rf}}{2\cos(\delta)} - \omega_z l_f \tan(\delta) \quad (14)$$

$$\hat{V}_{x3} \approx v_{sensor-lf}\sec(\delta) + \omega_z[t_f - l_f \tan(\delta)]$$

$$\hat{V}_{x4} \approx v_{sensor-rf}\sec(\delta) - \omega_z[t_z - l_f \tan(\delta)].$$

In order to confidently use equations (12) and (13) to compute the longitudinal velocity, the magnitude of the contact pitch slip velocities is quantitatively captured in step 66. The variables $d_f$ and $d_r$ are the contact patch velocity differences between left and right wheels in front and rear axles, $m_f$ and $m_r$ as defined as the mean value of the left and right wheels in front and rear axles, i.e., $$d_f = |v_{cp-lf} - v_{cp-rf}|, \quad m_f = \frac{v_{cp-lf} + v_{cp-rf}}{2} \quad (15)$$

$$d_r = |v_{cp-lr} - v_{cp-rr}|, \quad m_r = \frac{v_{cp-lr} + v_{cp-rr}}{2}.$$

Thus defined $d_f$, $d_r$, $m_f$ and $m_r$ can be calculated from the known signals, including the wheel speeds, the yaw rate, the steering angle (at wheel) and the estimated vehicle longitudinal velocity as in the following $$d_f = |v_{rf-sensor} - v_{lf-sensor} - 2\omega_z l_f \cos(\delta)| \quad (16)$$

$$m_f = \left|\frac{v_{rf-sensor} - v_{lf-sensor}}{2} - \hat{V}_x[\cos(\delta) + \sin(\delta)\tan(\beta)] - \omega_z l_f \sin(\delta)\right|$$

$$d_r = |v_{rr-sensor} - v_{lr-sensor} - 2\omega_z t_r|$$

$$m_r = \left|\frac{v_{lr-sensor} + v_{rr-sensor}}{2} - \hat{V}_x\right|$$

where $m_f$ can be approximately computed independent of the vehicle side slip angle as in the following $$m_f \approx \left|\frac{v_{rf-sensor} + v_{lf-sensor}}{2} - V_x \cos(\delta) - \omega_z l_f \sin(\delta)\right|. \quad (17)$$

Hence in step 68 if the computed quantities in equation (16) are all smaller than certain thresholds, i.e., $$d_f \leq \gamma_1,$$

$$m_f \leq \gamma_2,$$

$$d_r \leq \gamma_3,$$

$$m_r \leq \gamma_4,$$

are true for the calibrated parameters $Y_1, Y_2, Y_3, Y_4$ then the contact patch slip velocities are considered negligible. In this example, the minimum value from equation (13) is chosen. In step 68, if the equations in (18) are not satisfied, further analysis is needed.

One of such cases, where equation (18) is not satisfied is when the vehicle is driven with steady state steering. One example of this case is where the vehicle is on a corkscrew and the vehicle has very tight turn but with almost constant steering input. Thus, a steady state steering longitudinal velocity may be determined in step 72. In this case, if the rear wheels are negotiating the path of the vehicle, then the following is true for vehicle corner velocities $$\frac{V_{lf} - V_{rf}}{V_{lr} + V_{rr}} = \frac{V_{lr} - V_{rr}}{V_{lf} + V_{rf}}. \quad (19)$$

Based on this condition, the vehicle longitudinal velocity $V_x$ (based on steady state steering) can be estimated as $$\hat{V}_{x-ss-steer} = \frac{t_f \cos(\delta)\sin(\delta)}{t_r - t_f \cos(\delta)[\cos(\delta) - \sin(\delta)\tan(\beta)]} l_f \omega_z. \quad (20)$$

Considering $\sin(\delta)\tan(\beta)$ is negligible in contrast to $\cos(\delta)$, an approximate of equation (20) which is independent of the vehicle side slip angle $\beta$ can be expressed as $$\hat{V}_{x-ss-steer} \approx \frac{t_f \cos(\delta)\sin(\delta)}{t_r - t_f \cos^2(\delta)} l_f \omega_z. \quad (21)$$

If equation (18) is not satisfied and the vehicle is not in steady state steering, then a further correction to recover the errors due to the contact patch slips is needed.

The instantaneous longitudinal velocity $V_x$ may be written as the sum of two portions: (1) the portion from the spinning of the four wheels as computed in (12), or (21); (2) the longitudinal sliding portion due to the wheel slip. In step 74, the non-slip longitudinal velocity is set as either that of equations (12) or (21) which is denoted as $V_{x-noslip}$ and is either $\hat{v}_x$ or $v_{x-ss-steer}$ from steps 70 or 72.

The portion contributed by wheel slip is denoted as at the slip related longitudinal velocity $V_{x-slip}$, then $$V_x = V_{x-noslip} + V_{x-slip} \quad (22)$$

The vehicle longitudinal acceleration and vehicle pitch attitude information may be used to perform the correction of the longitudinal velocity of the vehicle and determine the slip related longitudinal velocity in step 76. The longitudinal acceleration sensor signal can be divided into three parts as in the following $$a_{x-sensor} = \hat{V}_x - V_x \tan(\beta)\omega_{z-sensor} - g\theta_y \quad (23)$$

Therefore $V_{x-slip}$ can satisfy the following $$\hat{V}_{x-slip} - V_{x-slip} \tan(\beta)\omega_{z-sensor} \quad (24)$$

where $$f(t) = a_{x-sensor} - g\theta_y - \hat{V}_{x-noslip} \tan(\beta)\omega_{z-sensor} \quad (25)$$

The analytic solution for $V_{x-slip}$ can be obtained as in the following $$V_{x-slip}(t) = e^{\int_0^t \tan(\beta(\tau))\omega_{z-sensor}(\tau)d\tau} \int_0^t f(\tau) e^{-\int_0^t \tan(\beta(\tau))\omega_{z-sensor}(\tau)d\tau} d\tau. \quad (26)$$

A digital iterative scheme can be derived to compute $V_{x-slip}$ from equation (26) as in the following $$\Gamma(k+1) = \Gamma(k) + \tan(\beta(k+1))\omega_{z-sensor}(k+1)\Delta T$$

$$\Pi(k+1) = \Pi(k) + f(k+1)e^{\Gamma(k+1)}\Delta$$

$$V_{x-slip}(k+1) = \Pi(k+1)e^{-\Gamma(k+1)} \quad (27)$$

In step 78 the longitudinal velocity of the vehicle may be determined as:

$$V_x(k) = V_{x-nonslip}(k) + V_{x-slip}(k) \quad (28)$$

Once the corrected longitudinal vehicle reference velocity is determined, the safety system 40 may be controlled using this value. The way in which the safety system uses the longitudinal velocity varies depending on the type of safety system.

While particular embodiments of the invention have been shown and described, numerous variations and alternate embodiments will occur to those skilled in the art. Accordingly, it is intended that the invention be limited only in terms of the appended claims.

What is claimed is:

1. A control system for controlling a safety system of an automotive vehicle comprising:
   a plurality of wheel velocity sensors generating a plurality of wheel velocity signals;
   a steering-angle sensor generating a steering actuator angle signal;
   a yaw rate sensor generating a yaw rate signal;
   a longitudinal acceleration sensor generating a longitudinal acceleration signal;
   a pitch angle generator determining a pitch angle of the vehicle; and
   a controller coupled to the plurality of wheel speed sensors, the steering actuator angle sensor, the yaw rate sensor, the longitudinal acceleration sensor, and the pitch angle generator, said controller generating a final reference vehicle velocity in response to the plurality of wheel velocity signals, the steering angle signal, the yaw rate signal, the lateral acceleration signal and the pitch angle signal, said controller controlling the safety system in response to the final reference vehicle velocity.

2. A control system as recited in claim 1 wherein the safety system comprises a rollover control system.

3. A control system as recited in claim 1 wherein the safety system comprises a yaw control system.

4. A control system as recited in claim 1 wherein the safety system comprises an antilock brake system.

5. A control system as recited in claim 1 wherein the pitch angle generator comprises a pitch rate sensor.

6. A control system as recited in claim 1 wherein the controller determines a non-slip longitudinal velocity and a slip longitudinal velocity.

7. A control system as recited in claim 6 wherein the controller determines the non-slip longitudinal velocity from an average of the first rear wheel velocity and the second rear wheel velocity.

8. A control system as recited in claim 6 wherein the controller determines the non-slip longitudinal velocity in response to steering angle, yaw rate and the wheel speed of one of the plurality of wheels.

9. A control system as recited in claim 8 wherein the controller determines the non-slip longitudinal velocity as a function of track width.

10. A control system as recited in claim 6 wherein the controller determines the non-slip longitudinal velocity as a function of a distance to an axle to a center of gravity of the vehicle in a longitudinal direction.

11. A control system as recited in claim 6 wherein the controller determines a non-slip velocity comprises a longitudinal velocity for a steady state steering.

12. A control system as recited in claim 11 wherein the controller determines a longitudinal velocity for steady state steering in response to a function of the steering angle, the yaw angle and track length and the distance from the front axle to the center of gravity of the vehicle.

13. A control system as recited in claim 6 wherein the controller determines a slip-related longitudinal velocity in response to the pitch angle signal, the longitudinal acceleration signal and yaw rate signal.

14. A method of controlling a safety system for an automotive vehicle having a plurality of wheels comprising:
   determining a non-slip longitudinal velocity;
   determining a slip-related longitudinal velocity;
   determining a longitudinal velocity of the vehicle in response to the non-slip longitudinal velocity and the slip related longitudinal velocity; and
   controlling a safety system in response to the longitudinal velocity.

15. A method as recited in claim 14 wherein determining a non-slip longitudinal velocity comprises determining a first rear wheel velocity and a second rear velocity, determining the non-slip longitudinal velocity by determining an average of the first rear wheel velocity and the second rear wheel velocity.

16. A method as recited in claim 14 wherein determining a non-slip longitudinal velocity comprises determining a steering angle and a yaw rate and a wheel speed of one of the plurality of wheels, determining the non-slip longitudinal velocity as a function of steering angle, yaw rate and the wheel speed of one of the plurality of wheels.

17. A method as recited in claim 15 wherein determining a non-slip longitudinal velocity comprises determining the non-slip longitudinal velocity as a function of track width.

18. A method as recited in claim 17 wherein determining a non-slip longitudinal velocity comprises determining the non-slip longitudinal velocity as a function of a distance to an axle to a center of gravity of the vehicle in a longitudinal direction.

19. A method as recited in claim 14 wherein determining a non-slip velocity comprises determining a longitudinal velocity for steady state steering.

20. A method as recited in claim 19 wherein determining a longitudinal velocity for steady state steering comprises determining a steering angle, a yaw angle and track length and a distance from a front axle to a center of gravity of the vehicle, and determining the longitudinal velocity for steady state steering as a function of the steering angle, the yaw angle and track length and the distance from the front axle to the center of gravity of the vehicle.

21. A method as recited in claim 19 wherein determining a longitudinal velocity for steady state steering comprises determining the steady state steering velocity as $$\frac{l_f \cos(\delta)\sin(\delta)}{t_r - t_f \cos^2(\delta)} l_f \omega_z$$

where $t_f$ and $t_r$ are half tracks of a front and rear axles, $l_f$ and $l_r$ are the distances between a center of gravity of the vehicle and the front and rear axles and $\delta$ is a steering angle of the vehicle.

22. A method as recited in claim 14 wherein determining a slip-related longitudinal velocity comprises determining the slip-related longitudinal velocity in response to a pitch angle.

23. A method as recited in claim 14 wherein determining a slip-related longitudinal velocity comprises determining the slip-related longitudinal velocity in response to a pitch angle and a longitudinal acceleration.

24. A method as recited in claim 14 wherein determining a slip-related longitudinal velocity comprises determining the slip-related longitudinal velocity in response to a pitch angle, a longitudinal acceleration and a yaw rate.

25. A method of controlling a safety system for an automotive vehicle having a plurality of wheels comprising:

determining a plurality of wheel velocities for the plurality of wheels;

determining a steering angle;

determining a yaw rate determining a first longitudinal velocity from an average of the plurality of wheel velocities;

determining a second longitudinal velocity in response to the yaw rate and at least one of the plurality of wheel velocities;

determining a third longitudinal velocity in response to the yaw rate, steering angle and at least one of the plurality of wheel velocities;

determining a plurality of contact patch velocity values;

comparing the contact patch slip velocity values to a threshold;

in response to comparing, selecting one of the first second or third longitudinal velocities as a non-slip longitudinal velocity;

when the steering is steady state, selecting a steady state longitudinal velocity as a non-slip longitudinal velocity;

determining a slip-related longitudinal velocity, determining a vehicle longitudinal velocity as a function of the non-slip longitudinal velocity and the slip longitudinal velocity; and controlling a safety system in response to the vehicle longitudinal velocity.

26. A method as recited in claim 25 wherein said first longitudinal velocity is determined from an average of a right rear wheel velocity and a left rear wheel velocity.

27. A method as recited in claim 25 wherein determining a slip-related longitudinal velocity comprises determining a pitch angle and a longitudinal acceleration, and determining the slip-related longitudinal velocity in response to the longitudinal acceleration and the pitch angle.

28. A method as recited in claim 25 wherein determining a slip longitudinal velocity comprises determining a pitch angle and a longitudinal acceleration, and determining the slip-related longitudinal velocity in response to the longitudinal acceleration, the pitch angle and the yaw rate.

29. A method as recited in claim 25 wherein determining a pitch angle comprises determining a pitch angle in response to a pitch rate sensor.

30. A method as recited in claim 25 wherein determining a second longitudinal velocity in response to the yaw rate and at least one of the plurality of wheel velocities comprises determining a second longitudinal velocity in response to the yaw rate and at least one of the plurality of wheel velocities and a track width.

31. A method as recited in claim 25 wherein determining a third longitudinal velocity in response to the yaw rate, steering angle and at least one of the plurality of wheel velocities comprises determining a third longitudinal velocity in response to the yaw rate, steering angle and at least two of the plurality of wheel velocities.

32. A method as recited in claim 31 wherein the at least two of the plurality of wheel velocities comprise the right front and left front velocities.

33. A method as recited in claim 25 wherein determining a third longitudinal velocity in response to the yaw rate, steering angle and at least one of the plurality of wheel velocities comprises determining a third longitudinal velocity in response to the yaw rate, steering angle and at least one of the plurality of wheel velocities and a track width.

34. A method as recited in claim 25 wherein determining a third longitudinal velocity in response to the yaw rate, steering angle and at least one of the plurality of wheel velocities comprises determining a third longitudinal velocity in response to the yaw rate, steering angle and at least one of the plurality of wheel velocities, a track width and a distance from an axle to a center of gravity.

35. A method as recited in claim 25 wherein determining a plurality of contact patch velocity values comprises determining a contact patch velocity difference.

36. A method as recited in claim 25 wherein determining a plurality of contact patch velocity values comprises determining a contact patch velocity mean value.

37. A method as recited in claim 25 wherein determining a plurality of contact patch velocity values comprises determining a contact patch velocity difference and a contact patch velocity mean value.

38. A method as recited in claim 25 wherein comparing comprises comparing to a threshold and selecting is performed when the value is below the threshold.

39. A method as recited in claim 25 wherein said safety system comprises at least one selected from a rollover stability control system, a yaw control system, a traction control system or an antilock brake control system.

* * * * *